(12) United States Patent
Hua et al.

(10) Patent No.: US 8,275,016 B2
(45) Date of Patent: Sep. 25, 2012

(54) DEMODULATION METHOD AND DEVICE, EQUALIZATION METHOD AND SYSTEM IN TRANSMITTING DIVERSITY MODE

(75) Inventors: Meng Hua, Shenzhen (CN); Jing Yang, Shenzhen (CN); Nian Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 882 days.

(21) Appl. No.: 12/176,887

(22) Filed: Jul. 21, 2008

(65) Prior Publication Data

US 2009/0034585 A1 Feb. 5, 2009

(30) Foreign Application Priority Data

Aug. 3, 2007 (CN) .......................... 2007 1 0075565

(51) Int. Cl.
*H04B 1/00* (2006.01)
(52) U.S. Cl. ....................................................... 375/130
(58) Field of Classification Search .................. 370/203; 375/232, 260, 267, 316, 341
See application file for complete search history.

(56) References Cited

U.S. PATENT DOCUMENTS

| | | | | | |
|---|---|---|---|---|---|
| 6,058,138 | A | * | 5/2000 | Fukumasa et al. | 375/130 |
| 7,580,490 | B2 | * | 8/2009 | Suh et al. | 375/349 |
| 7,583,770 | B2 | * | 9/2009 | Troya et al. | 375/355 |
| 2005/0163240 | A1 | * | 7/2005 | Sakoda et al. | 375/260 |
| 2006/0072691 | A1 | * | 4/2006 | Kent et al. | 375/349 |
| 2007/0071071 | A1 | * | 3/2007 | Li et al. | 375/147 |
| 2007/0165735 | A1 | * | 7/2007 | Pan et al. | 375/267 |
| 2008/0304403 | A1 | * | 12/2008 | Zhong et al. | 370/203 |
| 2010/0322336 | A1 | * | 12/2010 | Nabar et al. | 375/267 |

FOREIGN PATENT DOCUMENTS

| | | |
|---|---|---|
| CN | 1599279 A | 3/2005 |
| CN | 1677892 A | 10/2005 |
| EP | 1724959 A1 | 11/2006 |

OTHER PUBLICATIONS

Written Opinion of the International Searching Authority in corresponding PCT Application No. PCT/CN2008/070326 (Jun. 12, 2008).
1st Office Action in corresponding Chinese Application No. 200710075565.6 (Jul. 20, 2011).
Extended European Search Report in corresponding European Application No. 08706699.9 (May 7, 2010).
Khemapatapan et al., "Performances of Differential-Encoded FFHMA Systems with Space-Frequency Coding over Nakagami-*m* Fading Channels," 2004, Institute of Electronic and Electrical Engineers, Geneva, Switzerland.
"R1-02-0327—Equalization for frequency selective channels," 3GPP TSG RAN WG1, Lucent Technologies, Valbonne, France.

* cited by examiner

*Primary Examiner* — Leon-Viet Nguyen
(74) *Attorney, Agent, or Firm* — Leydig, Voit & Mayer, Ltd.

(57) ABSTRACT

A demodulation method and device, an equalization method and system in a transmitting diversity mode are provided. The demodulation method includes: demodulating two equalized equalization signals respectively through a transmitting diversity mode; and then performing a maximum ratio combination on the demodulated signals. According to embodiments of the present invention, the two equalized signals are respectively demodulated according to a transmitting diversity mode, and then a maximum ratio combination is performed on the two signals to get a demodulated signal, which improves the performance of the demodulated signal and the equalization system.

6 Claims, 4 Drawing Sheets

DEMODULATION METHOD AND DEVICE, EQUALIZATION METHOD AND SYSTEM IN TRANSMITTING DIVERSITY MODE

CROSS-REFERENCE TO RELATED APPLICATIONS

This application claims priority to Chinese Patent Application No. 200710075565.6, filed Aug. 3, 2007, entitled "Demodulation Method and Device, Equalization Method and System in Transmitting Diversity Mode," the contents of which are hereby incorporated by reference in its entirety.

FIELD OF THE INVENTION

The present invention relates to a communication technology field, in particular to a demodulation method and device and an equalization method and system in a transmitting diversity mode.

BACKGROUND

RAKE receivers receive various multipath signals through a plurality of relevant detectors and combine the signals together. In the Wideband Code Division Multiple Access (WCDMA) downlink receiving, due to the inter-symbol interference (ISI) and multi-user interference caused by multipath, the performance of the RAKE receivers are affected, especially at a high data transfer rate (for example, High Speed Downlink Packet Access, HSDPA), because the spreading factor is relatively smaller, not only the anti-interference capability of the RAKE receivers is reduced, but also the diversity gain introduced by multipath combination is greatly reduced. Therefore, in the environment of WCDMA high data transfer rate, in order to achieve better performance, a linear minimum mean square error (LMMSE) equalizer receiving technology is usually adopted. The principle of the LMMSE equalizer is to minimize the mean square error between an outputted equalization signal after being processed by the LMMSE equalizer and the transmitting signal, so as to eliminate the interference caused by multipath.

Hereinafter, the working manner of the LMMSE equalizer in the transmitting diversity mode is introduced.

In WCDMA, the transmitting diversity mode includes space-time coding transmitting diversity and closed-loop transmitting diversity. In the space-time coding transmitting diversity, double antennas are adopted for transmission, and the coding manner is shown in FIG. 1, in which Antenna 1 and Antenna 2 transmit symbols $a_1$ and $a_2$ respectively. The data transmitted by Antenna 1 is kept unchanged after passing through a space-time encoder, and the data transmitted by Antenna 2 is coded into $-a_2^*$ and $a_1^*$ by the space-time encoder and then transmitted.

FIG. 2 shows a modulation mode of the closed-loop transmitting diversity. A dedicated physical control channel (DPCCH) signal and a dedicated physical data channel (DPDCH) signal are spread and scrambled after passing through the dedicated physical channel (DPCH), and then, the spread and scrambled DPCCH signal and DPDCH signal are weighted by $w_1$ and $w_2$, and then transmitted together with a common pilot channel (CPICH1) signal and a CPICH2 signal respectively through two antennas. $w_1$ is a scalar constant, and $w_2$ is a variable complex number, which is adapted to adjust the amplitude and phase of the data transmitted by Antenna 2, so as to maximize the power of the signal received by the receiver. $w_2$ is determined by a user equipment (UE) terminal, and then the information about $w_2$ is fed back to the base station. The common pilot signals CPICH1 and CPICH2 are still coded and transmitted in the manner of space-time coding, as shown in FIG. 3.

As shown in FIG. 4, an information signal x(k) is filtered by a shaping filter (root raised cosine (RRC) filter) and then transmitted. After the signal passes through a multipath fading channel overlapped with additive white Gaussian noise (AWGN), the receiver performs a receiving RRC filtering on the receiving signals to get a signal y(k). A channel estimation module receives the common pilot signal among the receiving signals to get channel estimation value H, and an equalizer weight calculation module calculates two equalizer weights $w_{d1}$ and $w_{d2}$ according to the channel estimation value H. The LMMSE equalizer 1 and LMMSE equalizer 2 perform an LMMSE equalization process on the signal y(k) through using $w_{d1}$ and $w_{d2}$, so that the equalization signals passing through the two LMMSE equalizers meet the requirement of minimizing the mean square error between the equalization signals and the transmitting signals of the two transmitting antennas. A demodulation module performs a processing on the equalized signals.

The received signal may be expressed as:

$$y(k) = \Gamma_1 x_1(k) + \Gamma_2 x_2(k) + n(k) \tag{1}$$

in which k represents a chip sequence number;

$$y(k) = [y_1(k), \ldots y_P(k), \ldots, \ldots, y_1(k+E-1), \ldots, y_P(k+E-1)]^T,$$

in which $y_P(k)$ represents the $p^{th}$ sample of the $k^{th}$ chip for the receiving signal;

$$x_i(k) = [x_i(k), x_i(k+1), x_i(k+2) \ldots, \ldots, x_i(k+E+L-2)]^T,$$

which represents the vector of the signal transmitted by the $i^{th}$ antenna;

$\Gamma_i$ represents a channel array, and the subscript represents the channel where the signal of the $i^{th}$ antenna passes through; and $$\Gamma_i = \begin{bmatrix} h_{1i}(L-1) & \ldots & h_{1i}(0) & & & \\ \vdots & & \vdots & & & \\ h_{Pi}(L-1) & \ldots & h_{Pi}(0) & & & \\ & & & \ddots & & \\ & & & h_{1i}(L-1) & \ldots & h_{1i}(0) \\ & & & \vdots & & \vdots \\ & & & h_{Pi}(L-1) & \ldots & h_{Pi}(0) \end{bmatrix}$$

in which $h_{pi}(l-1)$ (l=1, ..., L), (p=1, ..., P) is a channel coefficient of the $p^{th}$ sample of the $l^{th}$ chip on the $i^{th}$ antenna, and L is a channel delay spread in a unit of a chip.

The equalized signals and the transmitting signal on each of the two antennas respectively meet the minimum mean square error:

$$w_{d1} = \arg \min E\{\|w_{d1} y(k) - x_1(k+d)\|^2\} \tag{2}$$

$$w_{d2} = \arg \min E\{\|w_{d2} y(k) - x_2(k+d)\|^2\} \tag{3}$$

As derived from Weiner Optimization Formula, the following equation is obtained:

$$w_{di} = E\{x_i(k+d) y^H(k)\} E\{y(k) y^H(k)\}^{-1} \quad i=1,2 \tag{4}$$

in which i represents a corresponding antenna number.

Considering the equalization weight of Antenna 1, Formula (1) is substituted into Formula (4), and as $x_1(k)$ and $n(k)$ are irrelevant to each other, the following two circumstances are considered respectively:

$$E\{x_1(k+d)y^H(k)\}=E\{x_1(k+d)x_1^H(k)\}+E\{x_1(k+d)x_2^H(k)\} \quad (5)$$

$$E\{y(k)y^H(k)\}=\Gamma_1 E\{x_1(k)x_1^H(k)\}\Gamma_1^H+\Gamma_2 E\{x_2^H(k)x_2^H(k)\}\Gamma_2^H+E\{n(k)n^H(k)\}+\Gamma_1 E\{x_1(k)x_2^H(k)\}\Gamma_2^H+\Gamma_2 E\{x_2(k)x_1^H(k)\}\Gamma_1^H \quad (6).$$

As known from the coding manners of the space-time coding transmitting diversity and the closed-loop transmitting diversity, the transmitting signals of the two transmitting antennas are not completely independent and irrelevant. However, as the transmitting signals are combined by many users and code channels, in the closed-loop transmitting diversity mode, each user has a different weight, and the transmitting diversity adopted by each code channel is not the same, so it is difficult to get the relevant value between the transmitting signals of the two antennas, and thus approximation is introduced, in which the signals of the two transmitting antennas are assumed to be independent and irrelevant, that is, $E\{x_1(k+d)x_2(k)\}=0$, and d is an arbitrary number.

Under such approximation condition, $$E\{x_1(k+d)y^H(k)\}=e_d\Gamma_1^H\sigma_{x1}^2 \quad (7),$$

$$E\{y(k)y^H(k)\}=\Gamma_1\Gamma_1^H\sigma_{x1}^2+\Gamma_2\Gamma_2^H\sigma_{x2}^2+\sigma_n^2 \quad (8).$$

In the transmitting diversity mode, the transmitting powers of the two antennas are the same, which is $\sigma_x^2$, so that:

$$w_{d1}=e_d\Gamma_1^H\{\Gamma_1\Gamma_1^H+\Gamma_2\Gamma_2^H+\sigma_n^2/\sigma_x^2\}^{-1} \quad (9).$$

Similarly, as for transmitting Antenna 2, $$w_{d2}=e_d\Gamma_2^H\{\Gamma_1\Gamma_1^H+\Gamma_2\Gamma_2^H+\sigma_n^2/\sigma_x^2\}^{-1} \quad (10).$$

An approximation assumption is introduced into the above deriving process, in other words, regarding the signals of the two transmitting antennas as being completely irrelevant. However, in practice, the approximation cannot be ignored. If the last two items in Formula (6) are ignored, it inevitably causes loss of the performance. As can be seen from Formulae (9) and (10), the expressions for the taps of the two equalizers are quite similar to each other. As the transmitting antennas are generally very close to each other, the channel of Antenna 1 and the channel of Antenna 2 are similar to each other. In this case, the equalization signals output from the two equalizers inevitably contain the signals of the two antennas.

As the mean square error between the output of the equalizer 1 and the transmitting signal of the transmitting antenna 1 is at the minimum level and that between the output of the equalizer 2 and the transmitting signal of the transmitting antenna 2 is also at the minimum level, as shown in FIG. 5, the two equalization signals are equivalently considered as two transmitting signals, and after being descrambled and dispread, they are respectively decoded and demodulated according to the coding manner of the transmitting signals. The CPICH signal adopts the space-time coding manner in the two transmitting diversity modes, so the CPICH signal is decoded and demodulated in the space-time coding transmitting diversity mode under the two transmitting diversity modes. Therefore, for Antenna 1, the channel estimation value is obtained by directly being divided by a pilot symbol; for Antenna 2, the channel estimation value is obtained by being divided by a pilot symbol after odd-even reversal.

The high-speed physical downlink shared channel (HS-PDSCH) signal after being descrambled and dispread is approximately considered as a pattern merely containing one antenna. For the space-time coding transmitting diversity mode, the equalized signal conversion is shown in FIG. 6. The noises of the two transmitting antennas are considered as approximately the same, and the signals are multiplied by weight factors according to the signal-to-noise ratio, and then the same transmitting symbols are combined. The signal of Antenna 1 at the time t+1 and the signal of Antenna 2 at the time t are combined, and the signal of Antenna 2 at the time t+1 and the signal of Antenna 1 at the time t are combined. In the closed-loop transmitting diversity mode, because the modulation patterns are different, as shown in FIG. 7, the signals of Antenna 1 and Antenna 2 at the corresponding time are combined.

However, the two equalization signals are considered as signals respectively decoded according to one antenna, and the transmitting signals of the other antenna are considered as noise signals. Because the equalizers cannot completely convert the signals of the other antenna into random noises, the actual equalization signals are still blended with signals of the other antenna, which may results in loss of information. Furthermore, the combination manner changes the form of receiving signals, which causes that the diversity gain effect of the closed-loop transmitting diversity mode cannot be fully exerted.

Another solution, as shown in FIG. 8, in which an equal gain combination is directly performed after equalization, and then, after the combination, the channel estimation value and the demodulated signal are obtained in the conventional closed-loop transmitting diversity mode or the space-time coding transmitting diversity mode, and then a soft value is obtained and provided to the decoding module. In such a technical solution, the blending of the equalized signals from the two antennas is taken into consideration, instead of simply considering the equalized signals as signals from one transmitting antenna in the solution above. However, as the signal-to-noise ratios of the two antennas are different, if the equal gain combination is directly performed on the equalized signals, the maximization of signal-to-noise ratio is not realized, and when the noise powers of the two signals are different from each other, the performance of the demodulated signal is not ideal.

It can be seen from the above description that, the performances of the demodulated signal obtained through the two solutions are not ideal.

SUMMARY

Embodiments of the present invention are directed to a demodulation method and device and an equalization method and system in a transmitting diversity mode, which are capable of using information in the blended signals brought by approximation, and maximizing the signal-to-noise ratio after the combination without changing the form of received signals, so as to optimize the performance of the demodulated signal.

According to embodiments of the present invention, a demodulation method in a transmitting diversity mode is provided, which includes:

demodulating two equalized equalization signals respectively by adopting a transmitting diversity mode; and performing a maximum ratio combination on the two demodulated received signals.

According to embodiments of the present invention, an equalization method in a transmitting diversity mode is further provided, which includes:

receiving information signals and performing a transmitting root raised cosine (RRC) filter on the information signals;

performing overlapping additive white Gaussian noise (AWGN) multipath fading respectively on the information signals after being processed by the transmitting RRC filter;

receiving the information signals after passing through a multipath fading channel, and performing a receiving root raised cosine (RRC) filter on the signals;

performing channel estimation on the signals after being processed by the receiving RRC filter and a common pilot channel (CPICH) signal to get channel estimation values;

calculating equalizer weights according to the channel estimation values; and performing a linear minimum mean square error (LMMSE) equalization on the signals after being processed by the receiving RRC filter according to the equalizer weights.

The demodulating the equalized signals further includes:

demodulating two equalized equalization signals respectively by adopting a transmitting diversity mode; and performing a maximum ratio combination on the two demodulated received signals.

According to embodiments of the present invention, an equalization system in a transmitting diversity mode is provided, which includes: a plurality of transmitting shaping filters, a channel fading module, a receiving shaping filter, a channel estimation module, an equalizer weight calculation module, and a plurality of equalizers, and a demodulation device;

The transmitting shaping filter is adapted to receive information signals and perform a transmitting root raised cosine (RRC) filter on the information signals;

The channel fading module is adapted to perform overlapping additive white Gaussian noise (AWGN) multipath fading respectively on the information signals after being processed by the transmitting RRC filter;

The receiving shaping filter is adapted to receive the information signals passing through a multipath fading channel, and perform a receiving root raised cosine (RRC) filter on the signals;

The channel estimation module is adapted to get channel estimation values according to the signals after being processed by the receiving RRC filter and a CPICH signal;

The equalizer weight calculation module is adapted to calculate equalizer weights according to the channel estimation values;

The equalizer is adapted to perform a linear minimum mean square error (LMMSE) equalization on the signals after being processed by the receiving RRC filter according to the equalizer weights;

The demodulation device is adapted to demodulate the equalized signals and further includes:

a demodulation module, adapted to demodulate the two equalized equalization signals respectively by adopting a transmitting diversity mode; and a maximum ratio combination module, adapted to perform a maximum ratio combination on the two demodulated received signals.

According to embodiments of the present invention, a demodulation device in a transmitting diversity mode is provided, which includes a demodulation module and a maximum ratio combination module.

The demodulation module is adapted to demodulate the two equalized equalization signals respectively by adopting a transmitting diversity mode; and The maximum ratio combination module is adapted to perform a maximum ratio combination on the two demodulated received signals.

According to embodiments of the present invention, two equalized signals are demodulated respectively in a transmitting diversity mode, and then a maximum ratio combination is performed on the two signals to get a demodulated signal, which improves the performance of the demodulated signal and the equalization system.

DETAILED DESCRIPTION

The embodiments of the present invention are described by taking two transmitting antennas as an example, but are not limited to two transmitting antennas in practical applications. Multiple transmitting antennas are also applicable for technical solutions in embodiments of the present invention, as long as satisfying the requirements of the transmitting diversity mode.

Taking two transmitting antennas for an example, the principle of the LMMSE equalizer is to minimize the mean square error between the equalization signals after being processed by the LMMSE equalizer and the signals transmitted by the two antennas. However, the two antenna channels are similar to each other, and the last two items in the following two equations are Gaussian noise, that is, each equalization signal contains information from the other antenna:

$$w_{d1}y(k)=w_{d1}\Gamma_1x_1(k)+w_{d1}\Gamma_2x_2(k)+w_{d1}n(k);$$

$$w_{d2}y(k)=w_{d2}\Gamma_2x_2(k)+w_{d2}\Gamma_1x_1(k)+w_{d2}n(k).$$

In order to solve the problem that the equalization signals after being equalized by the LMMSE equalizer in the transmitting diversity mode cannot completely eliminate the interference between two antennas, in the embodiments of the present invention, the two equalized equalization signals are considered as signals containing transmitting patterns of the two antennas, and the two equalized equalization signals are respectively demodulated in the transmitting diversity mode, and then a maximum ratio combination is performed on the two demodulated received signals.

Figure 1:
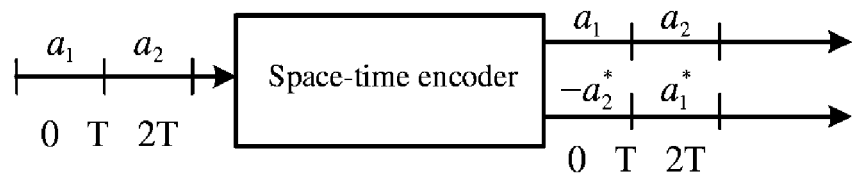
FIG. 1 is a schematic diagram of a coding manner of a space-time coding transmitting diversity mode.
Figure 2:
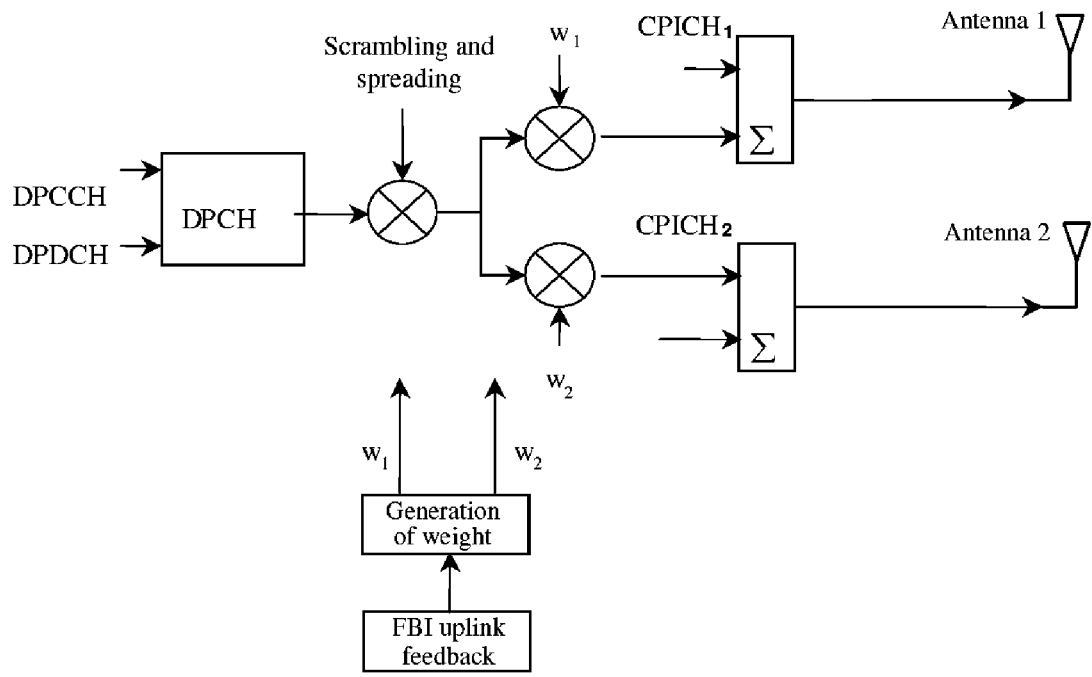
FIG. 2 is schematic diagram of a demodulation mode of a closed-loop transmitting diversity mode.
Figure 3:
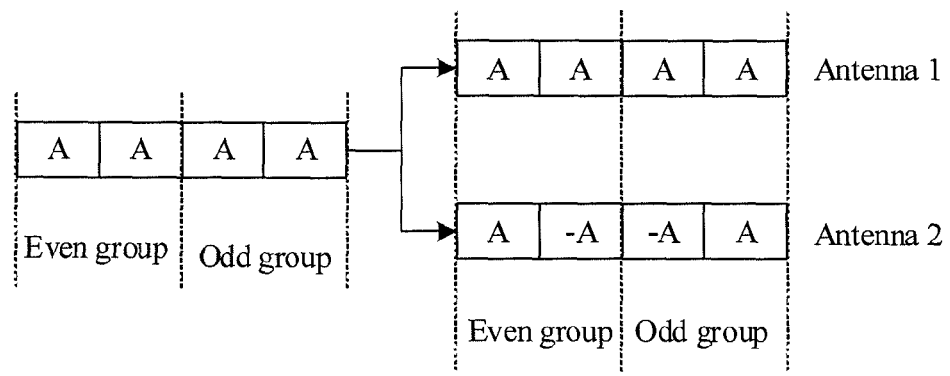
FIG. 3 is a schematic diagram of a transmitting pattern for a common pilot signal.
Figure 4:
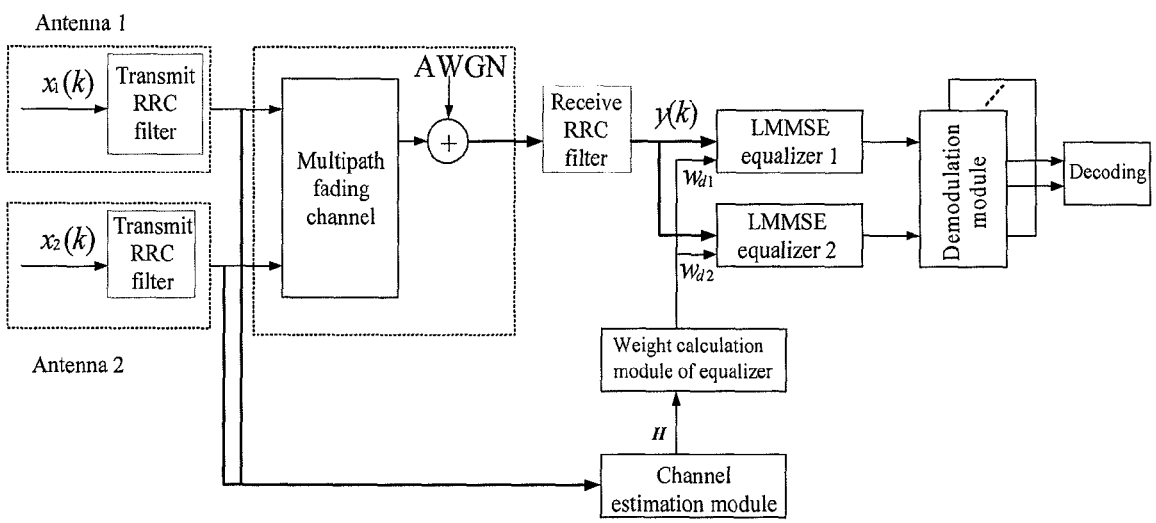
FIG. 4 is a schematic diagram of a system structure of an LMMSE equalizer.
Figure 5:
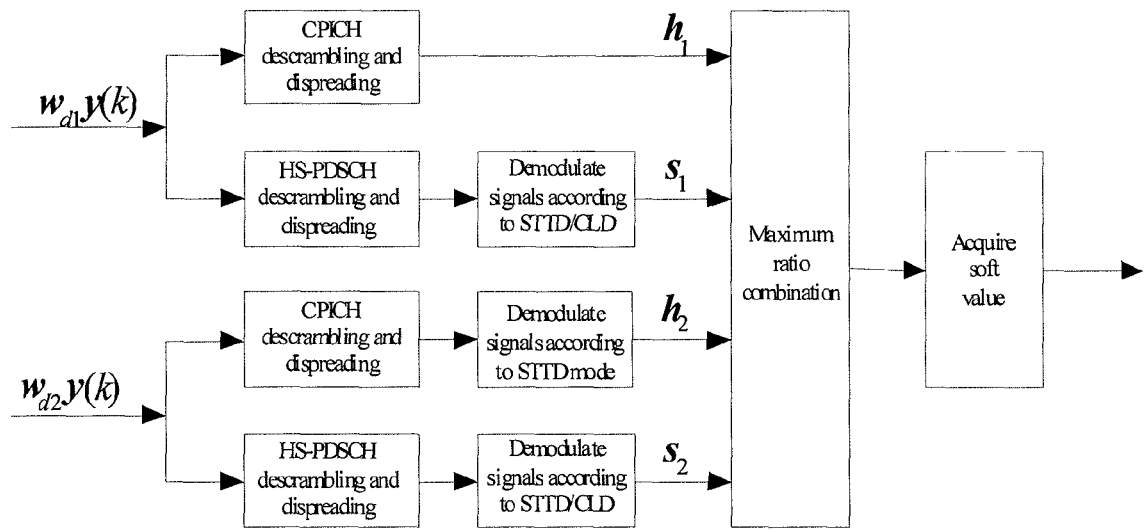
FIG. 5 is a schematic diagram of a demodulation module structure according to one approach.
Figure 6:
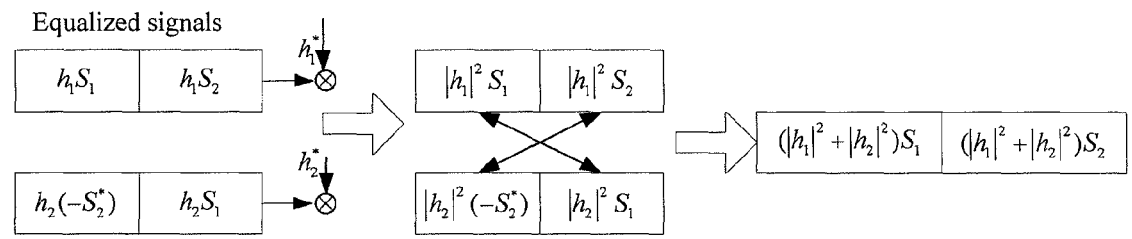
FIG. 6 is a schematic diagram of demodulating and combining signals in the space-time coding transmitting diversity mode in FIG. 5.
Figure 7:
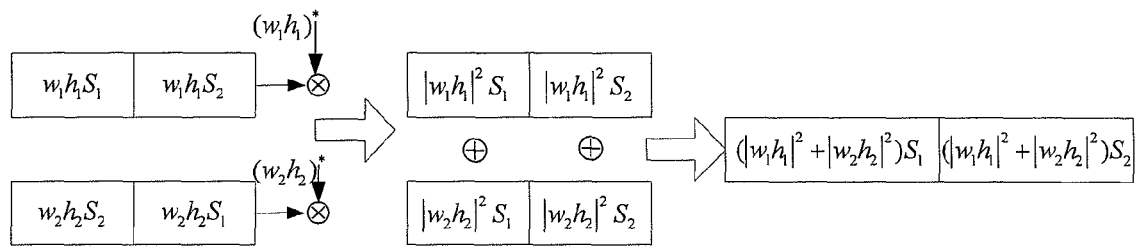
FIG. 7 is a schematic diagram of demodulating and combining signals in the closed-loop transmitting diversity mode in FIG. 5.
Figure 8:
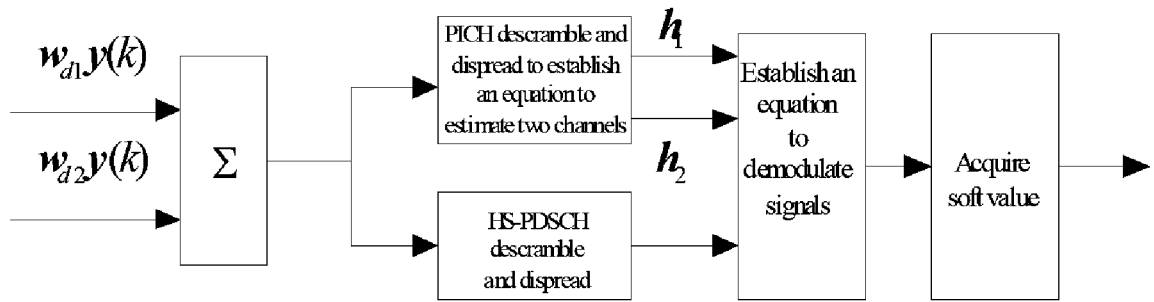
FIG. 8 is a schematic diagram of a demodulation module structure according to a second approach.
Figure 9:
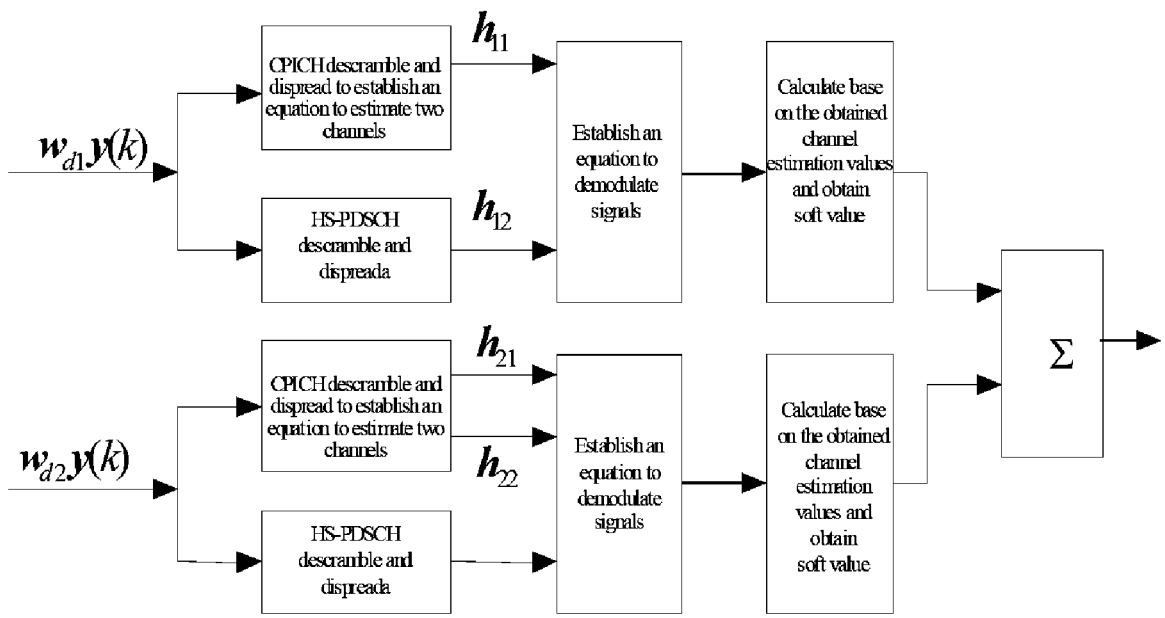
FIG. 9 is a schematic diagram of a demodulation device structure according to an embodiment of the present invention.

As shown in FIG. 9, an embodiment of the present invention provides a demodulation method in a transmitting diversity mode. The demodulation method includes the following steps.

In Step 901, channel estimation is performed on two equalized equalization signals in the transmitting diversity mode to get two channel estimation values of the two equalization signals respectively, in which $h_{11}$ and $h_{12}$ are two channel estimation values of a first equalization signal, and $h_{21}$ and $h_{22}$ are two channel estimation values of a second equalization signal.

Performing channel estimation on the two equalized equalization signals in the transmitting diversity mode further includes: performing CPICH descrambling and dispreading on the two equalization signals respectively to get symbols of the equalization signals and symbols of the CPICH; and performing channel estimation according to the symbols of the equalization signals and the symbols of the CPICH to get two channel estimation values of two equalization signals respectively. In the transmitting diversity mode, the CPICH signal is always coded in the space-time coding transmitting diversity mode. Therefore, in the transmitting diversity mode, the CPICH signal is demodulated in the space-time coding transmitting diversity mode. The channel estimation values may be obtained according to the known symbols of the equalization signals and the CPICH symbol. For example, it is assumed that the two antenna merely contain one path, and the channel estimation values are h1 and h2, then the symbols received at a first time point are r1=h1*A+h2*A, r2=h1*A+h2*(−A), and thus, if the CPICH symbol A and symbols r1, r2 of the receiving equalization signals are known, the channel estimation values h1 and h2 can be obtained.

In Step 902, according to the channel estimation values, the signals are demodulated through a manner of demodulating transmitting diversity signals to get two received signals respectively.

Demodulating the signals through a manner of demodulating transmitting diversity signals according to the channel estimation values includes: performing HS-PDSCH descrambling and dispreading respectively according to the obtained two channel estimation values of the two equalization signals to get two HS-PDSCH symbols. The HS-PDSCH symbol is a receiving signal. According to the known channel estimation values and the CPICH symbol, HS-PDSCH symbols in the space-time coding transmitting diversity mode or the closed-loop transmitting diversity mode can be obtained respectively.

The signals are demodulated through a manner of demodulating transmitting diversity signals, and the weight W is adjusted, so as to maximize the energy of the receiving signals. For example, in the closed-loop transmitting diversity mode, when the noise is ignored, the signal received in each path is $$r_1 = (h_{11}w_1S_1 + h_{12}w_2S_2)(\hat{h}^*_{11}\hat{w}^*_1 + \hat{h}^*_{12}\hat{w}^*_2);$$

$$r_2 = (h_{21}w_1S_1 + h_{22}w_2S_2)(\hat{h}^*_{21}\hat{w}^*_1 + \hat{h}^*_{22}\hat{w}^*_2).$$

Therefore, the weights W for the two equalization signals can be adjusted simultaneously to realize the maximization of the energy for the receiving signals.

In Step 903, a maximum ratio combination is performed on the two demodulated received signals. In this embodiment of the present invention, based on the obtained channel estimation values, the maximum likelihood ratio soft values of the two receiving signals are calculated and obtained respectively, and then the maximum likelihood ratio soft values are added together to realize the maximum ratio combination of the two receiving signals. That is through calculating and obtaining maximum likelihood ratio soft values of the two high speed physical downlink shared channel (HS-PDSCH) symbols respectively based on the obtained channel estimation values and adding the maximum likelihood ratio soft values together to realize the maximum ratio combination of the two receiving signals.

In practical applications, the process of adding the maximum likelihood ratio soft values together to realize the maximum ratio combination may not be used, but other methods may also be used to replace the above solution, so long as the combination rules meet the maximum ratio combination principle.

According to embodiments of the present invention, an equalization method in a transmitting diversity mode is provided, which includes:

receiving information signals, and performing a transmitting RRC filter on the information signals;

performing overlapping AWGN multipath fading respectively on the information signals after being processed by the transmitting RRC filter;

receiving the information signals after passing through a multipath fading channel, and performing a receiving RRC filter on the signals;

performing channel estimation according to the signals after being processed by the receiving RRC filter and a CPICH signal, to obtain channel estimation values;

calculating equalizer weights according to the channel estimation values; and performing LMMSE equalization on the signals after being processed by the receiving RRC filter according to the equalizer weights, to minimize the mean square error between the equalized equalization signals and the transmitted signals, so as to eliminate the interference caused by multipath.

The demodulating the equalized signals further including:

demodulating two equalized equalization signals respectively in the transmitting diversity mode; and performing a maximum ratio combination on the two demodulated received signals.

The demodulating the two equalized equalization signals respectively in the transmitting diversity mode includes: performing channel estimation on the two equalized equalization signals in the transmitting diversity mode, to get two channel estimation values of the two equalization signals respectively; according to the channel estimation values, demodulating the signals through a manner of demodulating transmitting diversity signals, to get two received signals.

The performing channel estimation on the two equalized equalization signals in the transmitting diversity mode includes: performing CPICH descrambling and dispreading on the two equalization signals respectively to get symbols of the equalization signals and symbols of the CPICH, and performing channel estimation according to the symbols of the equalization signal and the CPICH symbol. In the transmitting diversity mode, the CPICH signal is always coded in a space-time coding transmitting diversity mode. Therefore, in the transmitting diversity mode, the CPICH signal is demodulated in the space-time coding transmitting diversity mode. According to the known symbols of the equalization signal and the CPICH symbols, the channel estimation values can be obtained. For example, it is assumed that the two antenna merely contain one path, and the channel estimation values are h1 and h2, the symbols received at the first time point are r1=h1*A+h2*A, r2=h1*A+h2*(−A). If the symbols r1 and r2 of the receiving equalization signals and the CPICH symbol A are known, the channel estimation values h1 and h2 can be obtained.

The demodulating the signals through a manner of demodulating transmitting diversity signals according to the channel estimation values to get two received signals includes: performing HS-PDSCH descrambling and dispreading according to the obtained two channel estimation values of the two equalization signals, to get two HS-PDSCH symbols, i.e., two received signals. According to the known channel estimation values and the CPICH symbol, the HS-PDSCH symbols in the space-time coding transmitting diversity mode or the closed-loop transmitting diversity mode can be obtained respectively.

The signals are demodulated through a manner of demodulating transmitting diversity signals, and the weights W thereof are adjusted so as to maximize the energy of the receiving signals. For example, in the closed-loop transmitting diversity mode, when the noise is ignored, the signal received in each path is:

$$r_1 = (h_{11}w_1S_1 + h_{12}w_2S_2)(\hat{h}^*_{11}\hat{w}^*_1 + \hat{h}^*_{12}\hat{w}^*_2);$$

$$r_2 = (h_{21}w_1S_1 + h_{22}w_2S_2)(\hat{h}^*_{21}\hat{w}^*_1 + \hat{h}^*_{22}\hat{w}^*_2).$$

In this way, the weights W for the two equalization signals can be adjusted simultaneously to realize the maximization of the energy for the receiving signals.

A maximum ratio combination is performed on the two demodulated received signals. In this embodiment of the present invention, based on the obtained channel estimation values with the receiving signals, the maximum likelihood ratio soft values of the two receiving signals are calculated and obtained respectively, and then the maximum likelihood ratio soft values are added together to realize the maximum ratio combination of the two receiving signals. That is through calculating and obtaining maximum likelihood ratio soft values of the two HS-PDSCH symbols respectively based on the obtained channel estimation values and adding the maximum likelihood ratio soft values together to realize the maximum ratio combination of the two receiving signals. In practical applications, the process of adding the maximum likelihood ratio soft values together to realize the maximum ratio combination may not be used, instead, other methods may also be used to replace the above solution, so long as the combination rules meet the maximum ratio combination principle.

According to an embodiment of the present invention, an equalization system in the transmitting diversity mode is further provided, which includes: a plurality of transmitting shaping filters, a channel fading module, a receiving shaping filter, a channel estimation module, an equalizer weight calculation module, a plurality of equalizers, and a demodulation device;

The transmitting shaping filter is adapted to receive information signals and perform a transmitting RRC filter on the information signals;

The channel fading module is adapted to perform overlapping AWGN multipath fading respectively on the information signals after being processed by the transmitting RRC filter;

The receiving shaping filter is adapted to receive the information signals passing through the multipath fading channel, and perform a receiving RRC filter on the signals;

The channel estimation module is adapted to perform channel estimation according to the signal after being processed by the receiving RRC filter and the CPICH signal, to obtain channel estimation values;

The equalizer weight calculation module is adapted to calculate equalizer weights according to the channel estimation values;

The equalizer is adapted to perform LMMSE equalization on the signals after being processed by the receiving RRC filter according to the equalizer weights, minimize the mean square error between the equalized equalization signals and the transmitting signals, and eliminate the interference caused by multipath.

The demodulation device is adapted to demodulate the equalized signals. The demodulation device in a transmitting diversity mode further includes:

a demodulation module, adapted to demodulate the two equalized equalization signals respectively in the transmitting diversity mode; and a maximum ratio combination module, adapted to perform a maximum ratio combination on the two demodulated received signals.

The demodulation module includes:

a second channel estimation module, adapted to perform channel estimation on the two equalized equalization signals in the transmitting diversity mode, and get two channel estimation values of the two equalization signals respectively; and a signal demodulation module, adapted to demodulate the signals respectively through a manner of demodulating transmitting diversity signals according to the channel estimation values, and get two received signals.

The second channel estimation module may be a third channel estimation module adapted to perform CPICH descrambling and dispreading on the two equalization signals to get symbols of the equalization signals and symbols of the CPICH respectively, and perform channel estimation according to the symbols of the equalization signal and the CPICH symbol to get two channel estimation values of the two equalization signals respectively. $h_{11}$ and $h_{12}$ are two channel estimation values of a first equalization signal, and $h_{21}$ and $h_{22}$ are two channel estimation values of a second equalization signal. In the transmitting diversity mode, the CPICH signal is always coded in a space-time coding transmitting diversity mode. Therefore, in the transmitting diversity mode, the CPICH signal is demodulated in the space-time coding transmitting diversity mode. According to the known symbols of the equalization signals and the symbols of the CPICH, the channel estimation values can be obtained. For example, it is assumed that the two antenna merely contain one path, and the channel estimation values are h1 and h2, the symbols received at the first time point are r1=h1*A+h2*A, r2=h1*A+h2*(−A). If the symbols r1 and r2 of the receiving equalization signals and the CPICH symbol A are known, the channel estimation values h1 and h2 can be obtained.

The signal demodulation module may be a first signal demodulation module adapted to perform HS-PDSCH descrambling and dispreading according to the two channel estimation values of the obtained two receiving signals to get two HS-PDSCH symbols, i.e., two receiving signals. The HS-PDSCH symbols in the space-time coding transmitting diversity mode or the closed-loop transmitting diversity mode can be obtained respectively by setting up an equation and then solving the equation according to the known channel estimation values and the CPICH symbol.

The signals are demodulated through a manner of demodulating transmitting diversity signals, and the weights W thereof are adjusted, so as to maximize the energy of the receiving signals. For example, in the closed-loop transmitting diversity mode, when the noise is ignored, the signal received in each path is $$r_1 = (h_{11}w_1S_1 + h_{12}w_2S_2)(\hat{h}^*_{11}\hat{w}^*_1 + \hat{h}^*_{12}\hat{w}^*_2);$$

$$r_2 = (h_{21}w_1S_1 + h_{22}w_2S_2)(\hat{h}^*_{21}\hat{w}^*_1 + \hat{h}^*_{22}\hat{w}^*_2).$$

In this way, the weights W for the two equalization signals can be adjusted simultaneously to realize the maximization of the energy for the receiving signals.

The maximum ratio combination module includes a soft value calculation module and a combination module. The soft value calculation module is adapted to combine the obtained channel estimation values with the receiving signals, calculate and obtain maximum likelihood ratio soft values of the two HS-PDSCH symbols respectively and add the maximum likelihood ratio soft values together to realize the maximum ratio combination of the two receiving signals. The combination module is adapted to add the maximum likelihood ratio soft values together to realize the maximum ratio combination of the two received signals. In practical applications, the process of adding the maximum likelihood ratio soft values together to realize the maximum ratio combination may not be used, instead, other methods may also be used to replace the above solution, so long as the combination rules thereof meet the maximum ratio combination principle.

According to embodiments of the present invention, the blending of signals from the transmitting antennas of the LMMSE equalizers are taken into consideration, and the two equalized equalization signals are considered as signals containing the transmitting patterns from the two antennas. The two equalized signals are demodulated by adopting the transmitting diversity mode, and then, a maximum ratio combination is performed on the two signals. Therefore, through utilizing the information in the blended signals brought by approximation, the signal-to-noise ratio after combination is maximized, without changing the form of the receiving signals, so as to optimize the performance of the demodulated signal. Furthermore, the structure of the original RAKE receiver is maintained with slight modifications, and thus, the present invention has a lower implementation cost.

The above description is only illustrative embodiments of the present invention. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A demodulation method in a transmitting diversity mode, comprising:
    performing channel estimation on two equalized equalization signals in the transmitting diversity mode to get two channel estimation values of the two equalization signals respectively;
    performing high speed physical downlink shared channel descrambling and dispreading by using the two channel estimation values of the two obtained equalization signals to get two high speed physical downlink shared channel symbols respectively; based on the obtained channel estimation values, calculating and obtaining maximum likelihood ratio soft values of the two high speed physical downlink shared channel symbols respectively; and
    adding the maximum likelihood ratio soft values together to realize the maximum ratio combination of the obtained equalization signals.

2. The method according to claim 1, wherein the step of performing the channel estimation on the two equalized equalization signals respectively in the transmitting diversity mode comprises:
    performing common pilot channel descrambling and dispreading on the two equalization signals to get symbols of the equalization signals and symbols of the common pilot channel, and performing the channel estimation according to the symbols of the equalization signals and the symbols of the common pilot channel.

3. An equalization method in a transmitting diversity mode, comprising:
    receiving information signals and performing a transmitting root raised cosine filter on the information signals;
    performing overlapping additive white Gaussian noise multipath fading respectively on the information signals after being processed by the transmitting root raised cosine filter;
    receiving the information signals passing through a multipath fading channel, and performing a receiving root raised cosine filter on the information signals;
    performing channel estimation on the signals after being processed by the receiving root raised cosine filter and a common pilot channel signal to get channel estimation values;
    calculating equalizer weights according to the channel estimation values;
    performing a linear minimum mean square error equalization on the signals after being processed by the receiving root raised cosine filter by using the equalizer weights; and
    demodulating the equalized signals;
    wherein the demodulating of the equalized signals further comprises:
    demodulating two equalized equalization signals respectively in the transmitting diversity mode; and
    performing a maximum ratio combination on the two demodulated received signals.

4. An equalization system in a transmitting diversity mode, comprising:
    a plurality of transmitting shaping filters, configured to receive information signals and perform a transmitting root raised cosine filter on the information signals;
    a channel fading module, configured to perform overlapping additive white Gaussian noise multipath fading respectively on the information signals after being processed by the transmitting root raised cosine filter;
    a receiving shaping filter, configured to receive the information signals passing through a multipath fading channel, and perform a receiving root raised cosine filter on the information signals;
    a channel estimation module, configured to get channel estimation values according to the signals after being processed by the receiving root raised cosine filter and a common pilot channel signal;
    an equalizer weight calculation module, configured to calculate equalizer weights according to the channel estimation values;
    a plurality of equalizers, configured to perform a linear minimum mean square error equalization on the signals after being processed by the receiving root raised cosine filter according to the equalizer weights; and
    a demodulation device, configured to demodulate the equalized signals, wherein the demodulation device further comprises:
    a demodulation module, configured to demodulate two equalized equalization signals in the transmitting diversity mode respectively; and
    a maximum ratio combination module, configured to perform a maximum ratio combination on the two demodulated received signals.

5. A demodulation device in a transmitting diversity mode, comprising:
    a demodulation module configured to demodulate two equalized equalization signals respectively in the transmitting diversity mode, comprising:

a channel estimation module, configured to perform channel estimation on the two equalized equalization signals in a transmitting diversity mode, to get two channel estimation values of the two equalization signals respectively; and a first signal demodulation module, configured to perform high speed physical downlink shared channel descrambling and dispreading according to the two channel estimation values of the two obtained equalization signals to get two high speed physical downlink shared channel symbols; and a maximum ratio combination module, configured to perform a maximum ratio combination on the two demodulated received signals, comprising:

a soft value calculation module, configured to calculate and obtain maximum likelihood ratio soft values of the two high speed physical downlink shared channel symbols respectively based on the obtained channel estimation values; and a combination module, configured to add the maximum likelihood ratio soft values together to realize the maximum ratio combination of the two demodulated received signals.

6. The device according to claim 5, wherein the second channel estimation module is a third channel estimation module, configured to descramble and dispread a common pilot signal on the two equalization signals respectively to get symbols of the equalization signals and a common pilot signal symbol, and perform the channel estimation according to the symbols of the equalization signals and the common pilot signal symbol to get the two channel estimation values of the two equalization signals respectively.

* * * * *